March 18, 1969 R. P. DINGWALL 3,434,131

PULSE WIDTH SENSITIVE MAGNETIC HEAD WITH ASSOCIATED BINARY IDENTIFICATION CIRCUIT

Filed Dec. 13, 1965

INVENTOR.
ROBERT P. DINGWALL

BY Roy R. Schlemmer, Jr.

ATTORNEY

United States Patent Office 3,434,131
Patented Mar. 18, 1969

3,434,131

PULSE WIDTH SENSITIVE MAGNETIC HEAD WITH ASSOCIATED BINARY IDENTIFICATION CIRCUIT

Robert P. Dingwall, Mahopac, N.Y., assignor to International Business Machines Corporation, Armonk, N.Y., a corporation of New York Filed Dec. 13, 1965, Ser. No. 513,490
U.S. Cl. 340—174.1 9 Claims
Int. Cl. G11b *5/00*

The present invention relates to a magnetic recording system. More particularly, it relates to such a system utilizing variable width pulses for representing binary data on a magnetic tape or the like.

Due to the inherent on, off or 0, 1 characteristics readily achievable by most electronic circuitry, most present day digital computing systems operate in the binary system or in some direct modification thereof wherein information and logic are readily representable by two stable state devices. Such computers normally require memory devices for storing large quantities of digital information representing both data and instruction in the form of binary bits, i.e., ones and zeros. Magnetic storage media are ideally suited for storing this type of information due to the inherent characteristic of magnetizable mediums to be in one of two stable magnetic states. Three principal types of magnetic memories are currently employed in large electronic computers. These are the high speed core memories, magnetic drum memories, and magnetic tapes. In the latter two memory systems, the medium is conventionally moved relative to a "writing" transducer which magnetizes successive areas of the medium in either of two modes for representing the respective binary values 0 and 1. The magnetic medium which has been so recorded is then moved past a "reading" transducer which develops a signal representative of the information recorded on the medium.

The two principal recording systems for recording on a magnetizable medium utilized in the prior art are the restore-to-zero and the non-restore-to-zero systems. In the first, the binary value 1 may be represented by a positive pulse and the binary value 0 may be represented by a negative pulse, i.e., opposite directions of magnetization. An area in between digits is left unsaturated and this area is normally utilized to separate the individual digits or bits. However, it is characteristic of such magnetizable media that when they are continually biased in opposite directions the attempts to return same to zero may not necessarily be effective, i.e., residual magnetization effects and the like often produce unwanted pulses and inaccurate outputs in the reading circuitry. To avoid this problem, complicated and expensive erasing circuitry for completely erasing and restoring these areas to zero must be provided.

The second conventional recording system, the non-restore-to-zero, utilizes saturation of the magnetic medium in a first direction to represent a zero and saturation in a second direction to represent the one. However, there is no intermediate nonmagnetized area to represent the space between bits and a change of the magnetic signal recorded on the medium only occurs at a boundary between 1 and 0. It may readily be seen that when strings of 0's or 1's occur, a continuous signal is recorded on the tape and no means is readily available for detecting bit boundaries, i.e., the number of bits along a length of the recording surface where a continuous signal is recorded. Such systems require external clocking or synchronizing to operate properly and again, require expensive and eleborate clocking circuitry.

A third system known in the art utilizes the non-restore-to-zero recording technique but utilizes different width pulses to distinguish between 0's and 1's. In such a system a 1 is represented by a positive pulse of a first duration immediately followed by a negative pulse of a second duration. A binary 0 is represented by a first positive pulse but of a duration significantly greater or less than that of the land again, followed by a pulse of the opposite polarity. Thus, both pulses are represented by first a positive signal recorded on the magnetizing medium followed by a negative signal but the pulses are distinguished from each other by the length of the first pulse. Such a system is described in U.S. Patent No. 2,887,674 of G. B. Green, filed May 19, 1959. In the system disclosed in this patent, a reading head is utilized which produces opposite polarity pulses or spikes at those places where the magnetization reverses. The polarity of the pulse obviously depends upon the direction of the reversal of the recorded signal. These pulses are then passed through appropriate amplifiers, detectors, and timing circuitry wherein the interval between succeeding pulses of opposite polarity is measured and depending upon said measurement, a 0 or 1 is indicated by the system. However, the various amplifiers, detectors, and more especially the timing and compare circuitry are both expensive and sensitive to the speed of writing and reading and also, cause problems with any significant variation of either of these speeds.

The present invention is primarily applicable to magnetic recording systems of the type utilizing magnetic tapes or tape loops for serial recording and reading of binary data. It further constitutes an improvement over the detection system utilized, for example, in the abovementioned patent wherein variable pulse width recording techniques are utilized to represent binary 1's and 0's.

It has now been found that a very simple and versatile magnetic recording system may be realized by utilizing the inherent properties of certain magnetic tape read heads for producing readily distinguishable output pulses in conjunction with the variable pulse width recording of binary data. By choosing a magnetic reading head for use with the tape system having the proper frequency characteristics, the head itself will produce pulse sets wherein the detection of a 1 or 0 may be readily determined.

It is accordingly a primary object of the present invention to provide a magnetic recording system wherein the variable pulse width recording of magnetic tape or the like is utilized to represent binary information.

It is a further object of the invention to provide such a system wherein the basic binary detection is accomplished in the head itself.

It is a further object to produce such a system which is inherently self-clocking and self-synchronizing.

It is yet another object of the invention to provide such a system which is readily adaptable to reading in either the forward or reverse direction.

The foregoing and other objects, features and advantages of the invention will be apparent from the following more particular description of preferred embodiments of the invention, as illustrated in the accompanying drawing.

Figures 1A, 1B, 1C, 1D:
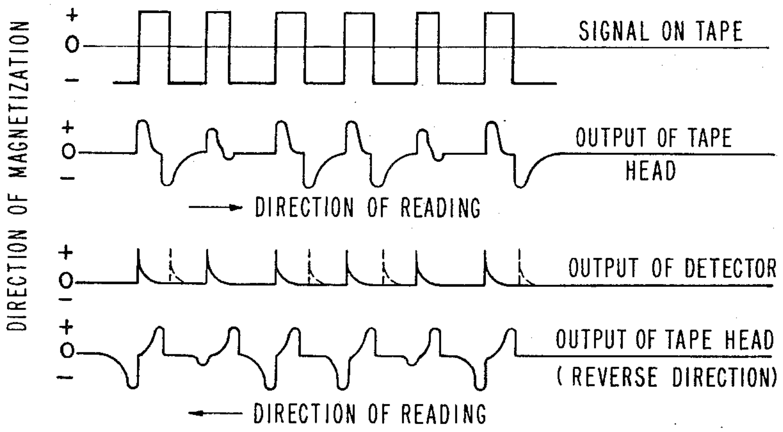
FIG. 1A is a graphical representation of variable pulse width binary data recorded on a magnetizable recording medium.
FIG. 1B is a graphical representation of the signal obtained by the reading head of the present invention when a magnetizable medium having the information indicated in FIG. 1A is traversed by same.
FIG. 1C is a graphical representation of the output of the detector shown in FIGS. 3 and 4.
FIG. 1D is a graphical representation of the output of the reading head when the tape having the binary data indicated in FIG. 1A is passed thereunder in a direction opposite to that of FIG. 1B.

The objects of the present invention are accomplished in general by a system for reading binary information from a magnetizable recording surface wherein the binary data is represented by wide and narrow pulses. The system comprises a reading head having a frequency response such that it produces a pulse of the first polarity but substantially no pulse of opposite polarity when it detects a narrow pulse and produces a pulse of a first polarity followed by an opposite polarity pulse of substantially equal magnitude when it detects a wide pulse on the recording surface. The output of the head is passed to a detection circuit which produces a first output when pulses of said first polarity are detected and a second output when pulses of opposite polarity are detected. The output of said detector is passed to a utilization means wherein said first output pulses are bit separation clock pulses related to the recorded binary data and the second outputs when detected indicate that one of the two binary signals recorded upon said magnetizable surface was detected at a point related to a particular clock pulse.

In a preferred embodiment of the invention, the first output from the detector is fed as a shifting input to a single bit input shift register and the second output is applied to the data input line of said shift register. Thus, assuming the shift register in its initial state is set to all 0's, the first output causes said shift register to shift register to shift 0's into succeeding stages unless a second output is obtained, and when obtained, said second output sets the input stage to a 1 whereby said 1 will be shifted into subsequent storage locations of said register until said register is filled, at which time it may be appropriately read out either serially or in parallel as is well known.

While variable pulse width recording of binary data is relatively well known in the art as exemplified by the previously cited Green patent, virtually all prior art systems rely on relatively costly, time-discriminating equipment to measure the interval between two opposite polarity spikes produced by a sharply differentiating reading head, that is, one which produces very sharp spikes at both the leading and trailing edges of a square wave pulse recorded on the magneizable surface such as a magnetic tape. The present invention utilizes the frequency response characteristics of many commercially available magnetic read-write heads, such for example, as those used in normal audio tape recorders which are unable to follow the rapid positive and negative traverse of a relatively narrow recorded square wave since insufficient time is allowed to store energy in the head on the first or positive traverse of the recorded signal such that when the trailing edge of the square wave is encountered, insufficient energy will have been stored in the head circuit to produce a pulse of opposite polarity. Conversely, when a wider pulse is utilized, for example, twice the width of the aforementioned narrow pulse, when the positive traversal of a recorded signal on the magnetizable medium is encountered, a pulse will be induced in the reading head and the magnetic field encountered persists for a sufficient length of time to, in effect, allow energy to be stored in the head and when the polarity of the recorded signal is reversed, a sufficient amount of energy will have been stored in the head to produce an opposite polarity pulse of substantially the same magnitude as said first pulse. These principles of operation are clearly set forth in the drawing in FIGS. 1B and 1D.

Referring to FIG. 1A, the method in which binary data is recorded on the tape is shown. The positive and negative directions of magnetization are indicated by the plus and minus respectively above the 0 axis of this figure. It will be noted in FIG. 1A that the binary "1's" are substantially twice as wide as binary "0's." And further, that a non-return-to-zero recording system is utilized.

Referring now to FIG. 1B, the output of a reading head is shown with the illustrated conditions of recorded binary data in FIG. 1A. It will be noted that in the first or left most bit position of FIG. 1A, a wide pulse corresponding to a binary "1" is recorded. Observing FIG. 1B in the same area, it will be noted that two substantially equal and opposite polarity pulses are produced by the reading head. The first pulse corresponds to the positive traversal of the signal recorded on the magnetic tape going from negative to the positive saturation and the second pulse occurs when the recorded signal returns to the negative saturated condition. Looking now at the second bit position, a narrow pulse is recorded corresponding to a binary "0." It will be noted that during this bit time the output of the tape head produces only a single positive pulse. It will further be noted that the amplitude of this positive pulse is not quite as large as that in the first instance and there is a very slight negative traversal upon the falling of the negative pulse back to the negative saturation value of the magnetic tape. As will be noted in the remainder of FIG. 1B, the same pulse pattern is repeated every time a binary "1" or binary "0" is encountered.

The following explanation of the operation of the recording head is considered to be a reasonable approximation of the operation of the device, however, it is to be noted that it is not intended that the invention be limited thereby.

Figure 2:
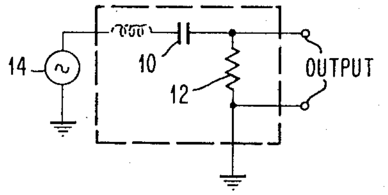
FIG. 2 is an equivalent circuit diagram of a magnetic reading head.

Referring to FIG. 2, there is shown a generally accepted equivalent circuit for a magnetic recording head. It will be noted that the inductance is shown in dotted lines and for the description of the overall operation of the system, this inductance is considered to be insignificant insofar as its effect on the frequency response of the charging of the capacitive part of the circuit is concerned. The capacitive element 10 and the resistance element 12 form a conventional R.C. circuit. The actual signal picked up by the recording head is represented as the signal source 14 which appears as a voltage across the R.C. circuit acting to charge same. The output is taken across the indicated terminals and thus is essentially responsive to the charging current which flows through the capacitive element 10. As is well known, when a signal or voltage is first applied across such a condenser, the current initially rises almost instantaneously to some maximum and gradually falls off as the condenser becomes charged. This initial current rise produces the initial positive pulses of FIG. 1B in both the wide and narrow pulse situations (by virtue of the IR drop across resistor 12). However, due to the R.C. time constant of the circuit, the condenser does not have time to charge to a substantial extent when a narrow pulse is encountered and when the signal is removed as when the trailing edge of the recorded square wave is encountered, there is insufficient energy stored across the condenser 10 to produce a substantial pulse in the opposite direction in the output due to the discharge of said condenser. However, when the time duration of the applied pulse is greater, the condenser becomes substantially fully charged and when the trailing edge of the pulse falls back to the negative value of saturation, the charge stored in the condenser flows through the circuit in the opposite direction to discharge same producing the negative pulses. It will be noted in referring to FIG. 1B in the second bit positions where a binary "0" is indicated, that some slight charging of the condenser is indicated by the small negative traversal of the pulse upon return of the recorded square wave to the negative saturation level and it will also be noted that the amplitude of the positive pulse is not quite as large; however, this latter condition is due more to the inductive effects of the circuit rather than the capacitive effects. Thus, the current build up in the shorter time period is retarded by said inductance as is well known. It should be noted that the general shape of the curves of FIG. 1B are reproduced from oscillographs taken across the output of a magnetic reading head during reading operations on recorded binary data of the type illustrated in FIG. 1A.

Figure 3:
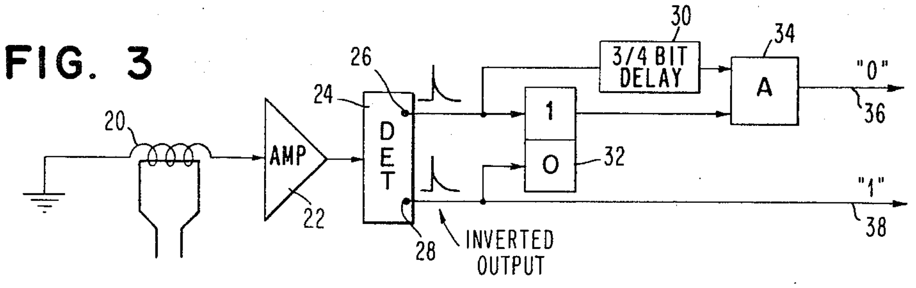
FIG. 3 is a functional block diagram of a general type of magnetic recording system incorporating the features of the present invention.

Referring now to FIG. 3, a system utilizing such a recording head is illustrated. It is, of course, understood that pick up head 20 is mounted on a suitable magnetic tape device or the like and that a tape containing variable pulse width binary information is to be passed in immediate proximity thereto so that the head may respond to such data. The output of the tape head 20 is passed to the amplifier 22 which suitably amplifies the output from the head and transmits same to the detector 24. The detector 24 by means of suitable rectifiers first separates the positive and the negative pulses and inverts the negative pulses. The positive pulses appear at the output terminal 26 as will be appreciated, a positive pulse will appear at this terminal every time that a positive pulse is produced by the recording head. This is illustrated in FIG. 1C wherein the spikes appearing in the solid line represent the positive pulses in FIG. 1B and the positive spikes represented by the dotted lines correspond to the previous negative pulses from the head which have been inverted and appear at the output terminal 28. It will be appreciated that the amplifier and detector may be designed to sharpen and amplify the output from the recorder head, thus, accounting for the spikes shown in FIG. 1C.

The output from the detector 24 may be utilized in a number of different ways to produce either a series of electrical pulses representing the originally recorded binary information or alternatively, to produce a different type of record such as a punched paper tape from the original magnetic record. In the embodiment illustrated in FIG. 3, the output 26 from the detector 24 is fed to the one input of the flip-flop 32 and at the same time fed to a three-quarter bit delay circuit 30. The output from the ¾ bit delay 30 as well as the one side of the flip-flop are fed to the AND gate 34. The function of this portion of the circuit is to produce a pulse on the line 36 every time a binary "0" is detected in the onput data, or stated conversely, when only a positive pulse is produced by the head 20. When the positive pulse appears on line 26, it will cause the flip-flop 32 to be set to a one and this output, in effect, enables the AND gate 34. Thus, when this pulse comes out of the delay 30, it will find the AND gate 34 enabled and will produce an appropriate pulse on line 36. However, if a pulse appears on terminal 28 from the detector 24, the flip-flop will be set to its "0" state and will thus prevent the pulse from the delay circuit 30 from passing through the AND gate 34. At the same time, the pulse on terminal 28 appears in the output line 38 and represents a binary "1." The delay in the circuit 30, it should be noted, is merely long enough to allow the pulse on line 28 to appear and as will be noted from the graph of FIG. 1C, the second pulse appears approximately ½ of a bit time after the first or system clock pulse.

The "0" and "1" outputs from the lines 36 and 38 of FIG. 3 may obviously be used in a number of different ways either as a direct electrical signal source representing the binary data or they may be used to energize, for example, a binary "1" and binary "0" punch position on a simple serial paper tape printer which uses a constant speed drive.

Figure 4:
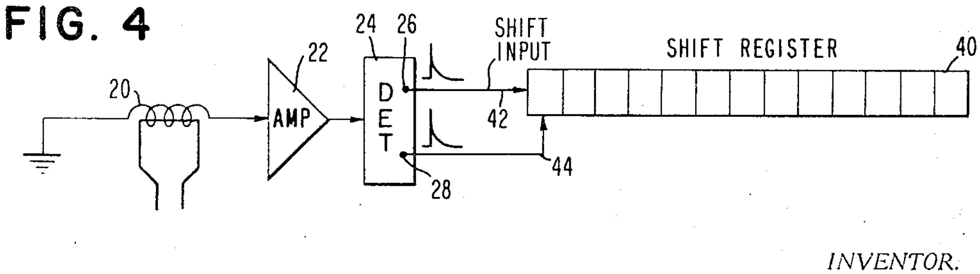
FIG. 4 is a functional block diagram of a preferred embodiment of a magnetic recording system embodying the principles of the present invention.

FIG. 4 represents a preferred embodiment of the present invention wherein the system is identical to that of FIG. 3 up through the detector 24. In this embodiment of the system, a shift register 40 is utilized to, in effect, perform the logic shown in FIG. 3 wherein every positive pulse from the terminal 26 is utilized as a shifting pulse and the output from the terminal 28 is utilized to set the input bit position of the shift register appearing under the input 44 to a binary "1." It will be noted that the shift register would initially bet set to all zeros and when only a positive pulse (representing a binary "0") on terminal 26 appears in a given bit time, the 0 will be shifted from the input position to the next position and this operation will continue with every positive bit occuring at terminal 26 until a bit also occurs at terminal 28 at which time a binary "1" will be suitably inserted in the input location.

In a practical operating embodiment, for example, the shift register 40 may be reset to all zeros with the exception of a one occuring in the first or initial reset position and then when a "1" is detected at the last register position it will indicate automatically that the register has been filled and assuming knowledge that the shift register is long enough to contain a single data word, automatic control means can gate the contents of the shift register out in parallel to another section of the computer where upon the shift register would again be reset to all zeros with the exception of the first position and the cycle is repeated. In this way, a simple and practical system for serially reading binary information from a magnetic tape and converting said information automatically into parallel is readily achieved.

FIG. 1D represents the system of the present invention operating with the data indicated in FIG. 1 passed by the recording head in the opposite direction. It will be noticed that the pattern of pulses is basically the same as that in FIG. 1B, however, it is the opposite edge of a given pulse which initiates the first or positive traverse. It will also be noted that there is a slight shift in the timing of the system in that the positive pulses are not spaced as equally as in the forward reading situation where the initial positive traverse always occurs at an approximate bit boundary. However, the systems of both FIGS. 3 and 4 are self-synchronizing, i.e., the precise timing of the positive and negative bit is not critical, only that they occur in the general sequence, i.e., a positive pulse followed by a negative pulse for a binary "1" or a positive pulse not followed by a negative pulse for a binary "0." It will thus be apparent that the precise circuitry shown in both FIG. 3 and FIG. 4 will work equally well with no modification whatsoever for either forward or reverse reading of the tape. Obviously, however, for the information to be used intelligently the machine operator must obviously know which way the tape is running.

The above feature points up the flexibility of the system insofar as not being critical of reasonable time variations inasmuch as even though the positive or clock pulses are spaced somewhat unevenly, the system works equally well especially with the serial-parallel effect of the shift register embodiment of FIG. 4.

With the present system, the requirements for the tape head are quite broad and need only meet the general specifications set forth previously. The head does not need a frequency response such that it faithfully reproduces low frequency audio signals nor does it require extremely high frequency response such that it is able to completely differentiate an incoming signal and produce a separate spike at both the leading and trailing edge as is the case with the standard variable pulse width according to systems as exemplified by the previously mentioned Green patent. For example, a tape head such as used on an "I.B.M. Executary" dictating machine head No. 211 having a nominal frequency response from 800 to 1200 c.p.s. was used successfully with a bit rate of 200 bits/second. It is, of course, obvious that any of a wide variety of commercially available tape heads would be adaptable to the present system. Further, the frequency response required of the tape head will obviously vary with the data bit rate or data frequency. With a greater data frequency which will necessarily result in the narrowing of both the wide and narrow pulses, the frequency response of the head would of necessity have to be raised in order that it be able to produce a bipolar pulse train with a wide pulse but only a single or substantially single polarity pulse with the narrow data bit pulse.

It should also be noted that although the preferred form of the invention comprises the use of a reading head having the desired frequency discriminating characteristics, it should be understood that this characteristic could alternatively be incorporated in the amplifier itself and a head used which produces a pulse at each edge of the square wave regardless of width. However, the use of a conventional amplifier together with a read head as described previously is the preferred form of the invention.

In summary, one significant advantage of the present system is the readily self-clocking feature wherein clock pulses are automatically produced by the system for whatever use it may be desired to make of same. A second advantage is the ready adaptability of the system to reading in either direction which feature has the obvious advantage of making a tape system more versatile insofar as eliminating re-wind operations. The system is also able to tolerate relatively wide variations in the speed of the tape drive provided said speed change is not so great as to vary the effective bit rate of the system whereby the frequency response characteristic of the head is no longer able to distinguish between wide and narrow pulses as previously described. However, with the above-mentioned sample, speed variations on the order of 30 to 50 percent could be tolerated without adversely affecting the operation of the system. Finally, and perhaps most important, the system allows the use of relatively inexpensive heads and even allows the mixing of audio as well as binary data on a given movable magnetic surface and the reading of both the binary and audio information with the same head.

While the system may readily be utilized with any movable magnetic medium, such as serial tape, drum, or conventional multitrack tape loop system, it has primary utility is reading serially recorded data such as encountered on conventional magnetic tape units.

While the invention has been particularly shown and described with reference to preferred embodiments thereof, it will be understood by those skilled in the art that various changes in form and details may be made therein without departing from the spirit and scope of the invention.

What is claimed is:

1. A magnetic recording system including:

means for reading information recorded on a magnetizable recording surface, wherein the binary data is represented by wide and narrow initial pulses, said reading means comprising:

the combination of a reading head and an amplifier, said combination having a frequency response such that it produces a pulse of a first polarity but substantially no pulse of opposite polarity when a narrow pulse is detected on the recording surface and produces a pulse of a first polarity followed by an opposite polarity pulse when a wide pulse is detected on said recording surface, and utilization means adapted to receive the pulses from said combination for indicating a first binary value when a first polarity pulse from said combination is followed immediately by another first polarity pulse, and for indicating a second binary value when a first polarity pulse from said combination is followed sequentially by an opposite polarity pulse.

2. A magnetic recording system as set forth in claim 1 wherein said reading head per se has a frequency response with respect to the recorded pulse width such that it produces a single pulse of a first polarity when it detects a narrow pulse and a single pulse of a first polarity followed by a single pulse of opposite polarity when it detects a wide pulse on said recording surface.

3. A magnetic recording system as set forth in claim 2 wherein said reading head, upon the detection of a wide pulse on the recording medium, produces said opposite pulses of a magnitude substantially equal to said first polarity pulses.

4. A magnetic recording system as set forth in claim 2 including:

detection means interposed between the output of said recording head and said utilization means for producing a first output pulse on a first output line when it detects a pulse of said first polarity and for producing a second output pulse on a second output line when it detects a pulse of said opposite polarity, and said utilization means is connected to the two output lines from said detection means.

5. A magnetic recording system as set forth in claim 4 wherein said utilization means includes:

means to utilize sequential first output pulses from said detection means as clock pulses for indicating bit separation of binary data being scanned by said system.

6. A magnetic recording system as set forth in claim 5 wherein said utilization means comprises:

a single bit shift register wherein said first output from said detection means is utilized as a single bit shifting input to said shift register and said second pulse is utilized to set binary data into a single first bit stage input location of said register.

7. A magnetic recording system as set forth in claim 4 wherein said utilization means includes:

means for producing a first output signal when a first output from said detection means is followed immediately by another first output, and means for producing a second output signal when said first output is followed immediately by a second output from said detection means.

8. A magnetic recording system as set forth in claim 7 wherein said utilization means further includes:

a flip-flop having its first input side connected to said first output from said detection means and its second input side connected to said second output from said detection means, a delay circuit having its input connected to the first output from said detection means and having a delay greater than the difference in width between said wide and narrow pulses but less than a full bit time, a two input AND circuit connected to the output of said delay and the first output of said flip-flop corresponding to the input set by the first output of said detector, means connected to the output of said AND circuit and to the second output of said detector for selectively indicating a given detected binary data bit depending on which output is active.

9. A magnetic recording system wherein binary data is recorded on the surface of a magnetizable medium such that one binary state is represented by a narrow width magnetic saturation in one direction followed by a saturation in the opposite direction and the other binary state is represented by a wide magnetic saturation in said one direction followed by saturation in said opposite direction, a magnetic reading head for detecting signals recorded on said surface having a frequency response characteristic with respect to the traversal time of said head over said wide and narrow saturation states such that the signal produced by scanning the narrow width state is above the low frequency cutoff of said head and the signal produced by scanning the wide state is below the low frequency cutoff of said head whereby a first polarity pulse is produced by said head when it detects a narrow saturation state and a first polarity pulse followed by an opposite polarity pulse is produced when said head detects a wide saturation state, detection means connected to the output of said head for producing a first output when a first polarity pulse is received from said head and for producing a second output when an opposite polarity pulse is received from said head, and a single bit shift register having a shifting input and a data setting input connected to the outputs of said detection means, the shifting input being connected to the first output of said detection means and the setting input being connected to the second output of said detection means.

References Cited

UNITED STATES PATENTS 3,357,003 12/1967 MacArthur -------- 340—174.1

BERNARD KONICK, *Primary Examiner.*

W. F. WHITE, *Assistant Examiner.*